(No Model.)
C. ROBERTS.
POTATO DIGGER.
No. 385,071. Patented June 26, 1888.
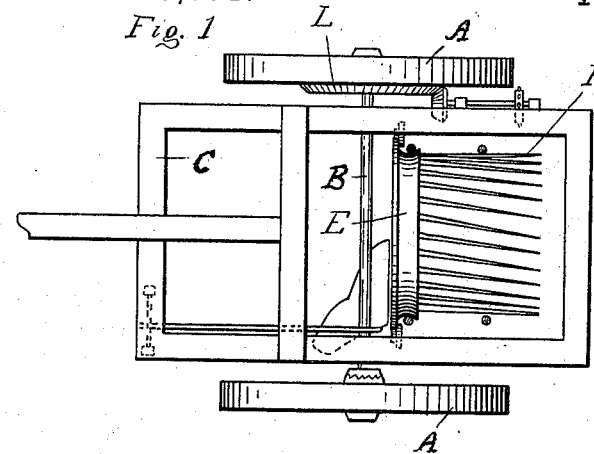
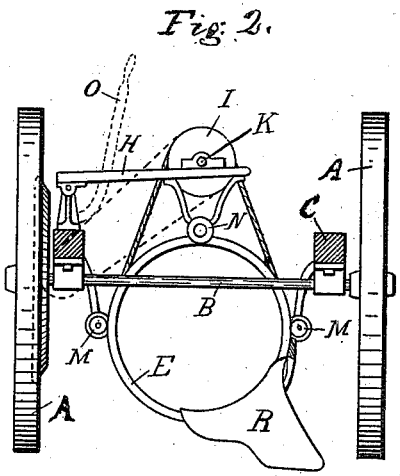
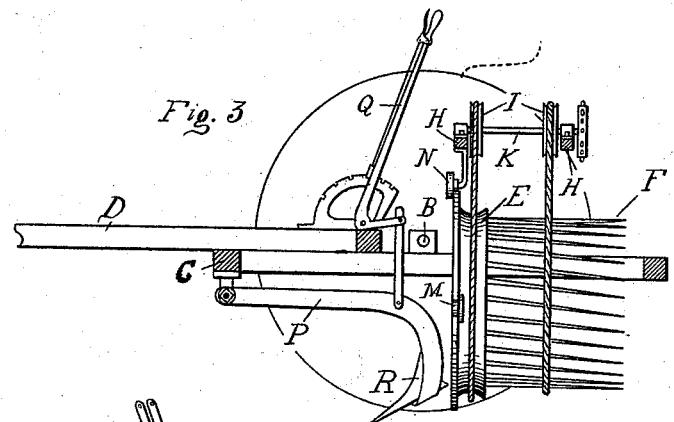
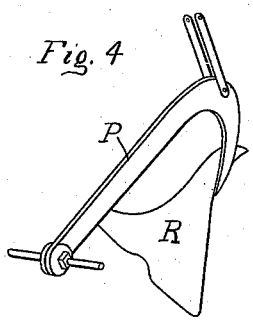
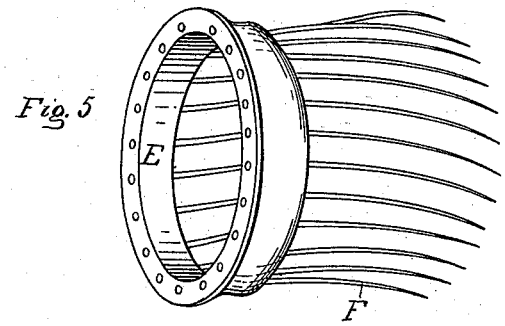
Witnesses:
P. M. Hulbert,
[signature]
Inventor:
Cyrus Roberts,
By Thos. S. Sprague & Son.
Att'ys.

UNITED STATES PATENT OFFICE.

CYRUS ROBERTS, OF THREE RIVERS, MICHIGAN.

POTATO-DIGGER.

SPECIFICATION forming part of Letters Patent No. 385,071, dated June 26, 1888.

Application filed November 12, 1887. Serial No. 254,972. (No model.)

*To all whom it may concern:*

Be it known that I, CYRUS ROBERTS, a citizen of the United States, residing at Three Rivers, in the county of St. Joseph and State of Michigan, have invented certain new and useful Improvements in Potato-Diggers, of which the following is a specification, reference being had therein to the accompanying drawings.

This invention relates to new and useful improvements in potato-diggers; and the invention consists in the peculiar construction and arrangement of the plow in connection with the revolving cage, and in the peculiar means for supporting a revolving cage, and in the peculiar construction of the cage, all as more fully hereinafter described.

In the drawings which accompany this specification, Figure 1 is a plan view of my improved potato-digger. Fig. 2 is a cross-section thereof. Fig. 3 is a side elevation thereof, and Fig. 4 is a detached view of the plow. Fig. 5 is a detached view of the cage.

A are suitable drive-wheels mounted upon the axle B; and C is the frame, of suitable shape to support the operating parts thereof, as shown.

The revolving cage consists of an annular head, E, to which the tines F are secured at the forward end and project rearwardly therefrom, with the interstices between the tines gradually enlarging and with a spiral twist in the tines, or, if preferred, set obliquely to the head, whereby a progressive motion is obtained in the revolution of the wheel to feed the contents toward the rear. This reel is freely suspended by means of cords, chains, or belts from a hinged frame, H, which carries the chain, cord, or belt-pulleys I, which revolve upon a shaft, K, and to which motion is conveyed by suitable connection with the gear-wheel L, secured to one of the drive-wheels, or in any other known manner. To hold the cage against lateral displacement in its suspended position, I provide the side rollers, M, which are in line with the center of the cage, or nearly so, so as to permit of the free vertical movement of the cage, and with the top roller, N, which is carried by the hinged frame. The hinged frame I provide with any suitable device, actuated by a lever, O, in proximity to the driver's seat for raising and lowering it. On the front of the cage I arrange a plow of peculiar construction, and which consists of the plow-beam P, pivotally secured at its forward end to the frame, so as to permit of its being raised and lowered by means of a hand-lever, Q, and having secured to its rear end the plow R, the rear end of which is adapted to discharge the ground into the cage while the front end does the digging. As will be seen, this plow stands at an angle to the line of draft, and to one side of the center of the draft, and with its point set "to land," all so arranged that the weeds and vines dug up by the plow in following a straight line of discharge to the rear will pass outside the reel, while the oblique curve shape of the plow itself will push the ground into the cage, thereby effecting a complete separation of the weeds and ground, one passing outside and the soil being discharged into the cage.

The advantages of my construction are—

First. That in suspending the cage entirely by means of ropes or their equivalents a great economy of power is obtained, as it must be seen that the cage will freely revolve with any load as the chains or ropes tighten in proportion thereto, the rollers being merely arranged to prevent undue displacement of the parts, without interfering with the normal operation in any way or with the free vertical adjustment of the cage from or toward the ground. I preferably use two ropes as being sufficient to obtain my object, although more ropes may be used, if desired, all of which are preferably made drivers.

Second. By setting the teeth obliquely or spirally in relation to the head the contents of the cage are quickly discharged, as the tines act as a screw-feed.

Third. The construction of the plow is of great advantage to effect a separation of the weeds from the soil and permitting the weeds and vines to pass on the outside, as it will readily be seen that in the forward motion of the plow the surface obstructions will pass directly to the outside and rear of the cage, while the soil is pushed directly into the cage; and to form a clear pathway for the cage I preferably provide the plow with the extension U, which acts as a scraper.

Fourth. The plow being combined as a separate part from the reel, I can adjust both independently from each other.

What I claim as my invention is—

1. In a potato-digger, a revolving cage consisting of a head and substantially straight spring-tines secured thereto and projecting obliquely or spirally therefrom to the rear, with their rear ends unsupported, substantially as described.

2. In a potato-digger, the combination, with the cage revolving on circumferential bearings, of a plow independent of said cage at an angle to the line of draft and to one side of the center of the draft, with its point to land, and provided with an extension, U, serving as a scraper, substantially as described.

3. The combination, with the supporting-wheels, axle, and frame of a potato-digger, of the digging-plow independently secured thereto, and provided with the raising and lowering lever Q, and of a revolving cage suspended by means of chains, straps, or equivalents, a hinged frame having suitable drive-pulleys over which said chains or straps pass, and a lever for raising and lowering said hinged frame, all arranged to operate substantially as described.

In testimony whereof I affix my signature, in presence of two witnesses, this 18th day of October, 1887.

CYRUS ROBERTS.

Witnesses:
   H. S. SPRAGUE,
   P. M. HULBERT.